Sept. 9, 1952     H. F. PHIPARD, JR     2,609,550
METHOD OF MAKING HEADED FASTENER
Filed June 28, 1949
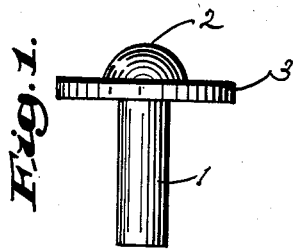
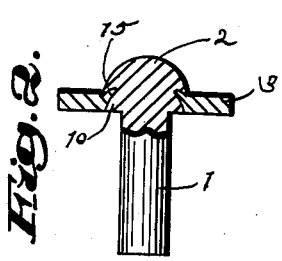
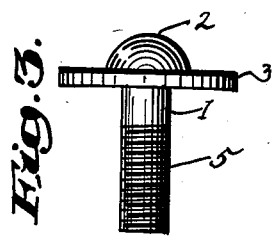
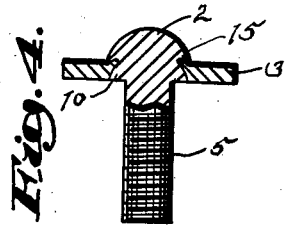
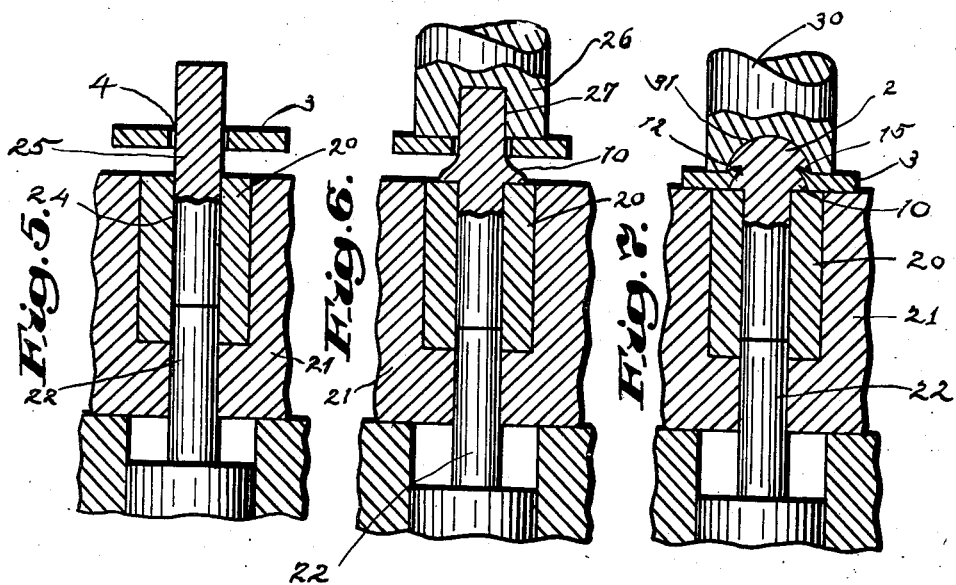
Inventor:
Harvey F. Phipard Jr.
by James R. Hodder
Attorney Patented Sept. 9, 1952

2,609,550

UNITED STATES PATENT OFFICE 2,609,550

METHOD OF MAKING HEADED FASTENER

Harvey F. Phipard, Jr., South Dartmouth, Mass., assignor to Research Engineering & Manufacturing, Inc., New Bedford, Mass., a corporation of Massachusetts Application June 28, 1949, Serial No. 101,810

1 Claim. (Cl. 10—27)

My present invention is a novel and improved method of manufacturing a headed fastener with a collar, washer, plate, or the like interlocked therewith.

Heretofore it has been customary to unite a headed fastener, bolt, rivet, screw or the like by forming a head thereon in a heading operation, and thereafter fitting a washer or collar over the shank of the fastener, and subsequently securing the collar by a separate operation; and thereafter completing the fastener by pointing and rolling or otherwise forming the threaded part on the shank and, if desired, trimming the collar, washer or plate.

This prior method required repeated handling, inspection of the fasteners to see that the washer was threaded onto the shank, and that same was secured by the subsequent operation.

In my present invention, I have eliminated the difficulties above briefly outlined and have devised a novel method of so uniting and interlocking the collar and the blank from which the fastener is to be made as to effectively interlock and entrap the metal both of the washer and fastener by the single operation of forming the head thereon.

In carrying out my invention, I first provide a blank from stock having a shank, and I provide a washer, collar, plate, or the like formed with a central opening of slightly greater diameter than that of the shank of the blank so that the same will slide freely on the shank during the first heading action. Thereupon, I assemble the washer on the shank where it is loosely held between a lower clamping die and an upper heading die.

The first heading operation acts to spread the material in the shank of the blank slightly, leaving the washer free and unattached; and thereupon a second heading operation effects the completion of the formation of the head on the end of the blank and simultaneously entraps or interlocks the metal of the washer with the formation of the head, this action forcing the metal of both head and washer to flow together into a rigid, firm, interlocking and dovetailed union.

If desirable, a series of successive heading operations can be performed, particularly where heavy stock is utilized, but ordinarily a preliminary heading and a subsequent completing and heading action are sufficient.

My invention also contemplates the provision of a novel form of heading dies to carry out this operation which unites the washer or collar during the formation of the head on the fastener. For this purpose I so construct and arrange the header dies for the first heading operation to fit snugly over the end portion of the blank and, thereupon, to effect a preliminary hammering, swaging, or heading action which will spread the metal intermediate the end portion from which the head is to be formed, and force the metal from the blank into a flange-like position adjacent the collar or washer which has been placed onto the blank; whereupon the successive heading action swages the metal on top of the washer and interlocks and entraps the same between the first flange-like spreaded part and the finished headed operation, as will be further explained.

Referring to the drawings illustrating a preferred embodiment of the present invention:

Fig. 1 is a side view of my improved headed blank and washer;

Fig. 2 is a corresponding view with the head and washer shown in cross-section;

Fig. 3 illustrates the further operation of threading the blank where a threaded shank is desired;

Fig. 4 is a corresponding view with the head and washer also in cross-section;

Fig. 5 is a diagrammatic view of the fitting of the blank in one of the dies with the washer assembled thereon, also in cross-section;

Fig. 6 is a corresponding view illustrating the first heading action wherein opposite end portions of the blank are fitted in corresponding dies, and the heading action spreads the intermediate flange-like element from the blank against which the washer is subsequently forced by the succeeding heading action, which is illustrated in Fig. 7, also in cross-section.

Referring to the drawings, the completed blank, fastener, rivet, or the like comprises the shank 1, head 2, and collar or washer 3; and, where desired, a threaded shank 5 is subsequently rolled or formed thereon.

The metal of the headed portion is shown as interlocked or entrapped around the inner diameter of the washer and the exterior of the head, as illustrated in Figs. 2, 4, and 7, with the first-formed flange 10 against which the washer 3 is forced, flowing the metal around the interior diameter of the washer as illustrated at 12, extending over the flange 10 and engaged and overlapped by the flow of metal, as indicated at 15, in the final formation of the head 2. This interlocking or entrapping of the metal under pressure of the heading action insures a firm, rigid union between the washer and the head, all of which is affected by the heading action.

These heading actions involve the steps as shown in Figs. 5, 6, and 7, wherein the blank 25 is fitted in a tubular die 20, which may be removably secured in a base or frame of the heading machine 21 thru which a plunger 22 is adapted to slide and contact with the end portion of the shank 1. The shank 1 is fitted in the die 20, which has a snug or sliding fit for the shank portion 1 of the blank 25 in the recess 24 of the die 20; and thereupon the washer 3 is placed on the opposite end of the blank 25, the inner diameter of the washer being slightly greater than that of the shank 25, as indicated at 4. Thereupon the heading die 26, which is provided with a central recess as shown at 27, also of substantially the same or snug-fitting diameter as the end of the blank 25 which projects from the die 20.

The first heading action now is performed by the relative movement of the die 26 and plunger 22, which effects compression from the opposite ends of the blank 25, producing a spreading or flange-like flowing of metal from the blank 25, as indicated at 10.

Thereupon, the heading die 30 is brought into position, having a recess 31 of suitable form to complete the heading action and force the metal from the end of the blank 25 into intimate interlocking with the rim of the washer 3, which has been forced down over the flange-like flow of metal 10 previously formed, thus completing the head 2.

This die 30 may be formed with any desired contour in the end to engage the blank and force it into shape, as by making the same round, square, hexagonal, or of other suitable contour corresponding to that of the die.

These heading operations would ordinarily be formed with the blank and header in horizontal alignment so that upon sliding the washer 3 over that part of the blank 25 which projects from the die 20, the washer will stay in position while the first heading action upon the extreme ends of the blank 25 is performed, which thus flows the metal into the flange 10. The recesses 24 in each die 20 and 27 in the die 26, which firmly engage the circumference of the blank, prevent the same from being swaged outwardly and insure the flowing of the metal into the flange-like element 10, while the washer 3 is still threaded in position.

Thus, the second heading action which forms the head 2 will flow the metal from the washer in and around the flange-like element 10 and interlocking with the same, as indicated at 15. The plunger 22 may be positioned to yield slightly during the first heading action, which thus facilitates the flow of metal 10 into the flange-like form during the swaging action of the die 26; whereupon the subsequent heading action as indicated in Fig. 7 would ordinarily be effected with the plunger 22 in rigid position to that of the header 30.

Thus, I provide a firm, strong union or interlocking of the collar or washer directly into and with the head of the fastener, all effectuated by the simple heading action, thus greatly simplyfying the securing of a washer or headed fastener together, while insuring a strong, firm union.

While I prefer to form the spreaded portion or flange-like mass of metal 10 by a preliminary compressing action, I may, if desired, form such a flange in advance of the assembling of the washer on the blank. In either event, the washer and blank are in juxta-position adjacent the heading end with a blank between the metal 10 and the heading die.

It will thus be appreciated that I have devised a new method utilizing novel types of dies and resulting in the formation of a new and novel type of headed fastener united or combined with a collar, washer, or the like wherein the material of the collar constitutes a part and parcel of the material in the head of the fastener. Thus, the metal or other material from which the fastener is formed, together with the material of the washer, are intimately embedded and interlocked together into a firm, solid, unitary structure and all affected by the swaging or heading operation to form the head itself on the fastener.

I believe that my method wherein the collar, washer or the like is assembled in a blank in advance of the head-forming action and then united therewith, as distinguished from prior methods of first forming the head and then assembling and securing the washer to the shank of the fastener, is a distinct novelty in this art, and I wish to claim the same herein broadly.

I also believe that the operation of having a washer or the like element surrounding the blank to be headed, and thereupon effecting the heading by including a part of the surrounding element into intimate interlocking relation with the material of the blank, is a distinct novelty and that the article made thereby producing a rigid unitary homogenous head and collar union is distinctly new, valuable, and an important discovery in this particular art.

I claim:

The improved process of forming a headed fastener by interlocking a stem and washer by successive cold-heading operations, which consists in assembling a washer over a stem adjacent one end, said washer having a central opening of greater diameter than that of the stem to permit the washer to slide on the stem during the first heading operation, holding said stem in a die, effecting a first heading action on the stem to flow a rim-like flange from said stem around the top surface of the die between the washer and the adjacent end of the stem, and thereupon performing a succeeding cold-heading operation, forcing said washer over said rim into the same plane flush with the lower surface of the washer, and simultaneously heading the adjacent end portion of the stem over the washer by said succeeding cold-heading action, whereby said washer and stem are interlocked, by the flow of metal from the stem both below and above said washer.

HARVEY F. PHIPARD, Jr.

REFERENCES CITED

The following references are of record in the file of this patent:

UNITED STATES PATENTS

| Number | Name | Date |
|---|---|---|
| 92,973 | Miles | Oct. 13, 1868 |
| 253,494 | Babcock | Feb. 14, 1882 |
| 362,274 | Hall | May 3, 1887 |
| 469,261 | Moran | Feb. 23, 1892 |
| 1,382,052 | Birrell | June 21, 1921 |
| 2,403,402 | Rossi | July 2, 1946 |